United States Patent [19]
Echigo et al.

[11] Patent Number: 5,790,042
[45] Date of Patent: Aug. 4, 1998

[54] AUTOMOBILE MULTIPLEX DATA COMMUNICATION METHOD AND SYSTEM CAPABLE OF PREVENTING CHATTERING PHENOMENON OF SWITCHING COMPONENT

[75] Inventors: Yuko Echigo, Sagamihara; Atsushi Sakagami, Yokohama; Tatsuya Sekido, Zama; Isao Yamamoto, Sagamihara, all of Japan

[73] Assignee: Nissan Motor Co., Ltd., Yokohama, Japan

[21] Appl. No.: 814,747

[22] Filed: Mar. 7, 1997

Related U.S. Application Data

[63] Continuation of Ser. No. 508,084, Jul. 27, 1995, abandoned, which is a continuation of Ser. No. 24,169, Feb. 22, 1993, abandoned.

[30] Foreign Application Priority Data

Feb. 20, 1992 [JP] Japan ................. 4-033509

[51] Int. Cl.$^6$ ......................................... H04Q 1/00
[52] U.S. Cl. ...................... 340/825.07; 307/10.1; 340/825.16; 340/870.16; 340/511; 340/526
[58] Field of Search ............ 340/825.06, 825.07, 340/825.16, 870.16, 511, 526; 371/69.1, 70; 307/10.1

[56] References Cited

U.S. PATENT DOCUMENTS

| | | | |
|---|---|---|---|
| 3,568,147 | 3/1971 | Gilson | 371/69.1 |
| 3,737,858 | 6/1973 | Turner | 340/511 |
| 4,085,403 | 4/1978 | Meir | 340/825.07 |
| 4,155,075 | 5/1979 | Weckenmann | 340/825.07 |
| 4,930,095 | 5/1990 | Yuchi | 340/825.06 |
| 4,942,571 | 7/1990 | Möller | 307/10.1 |
| 5,136,275 | 8/1992 | Madau | 340/511 |

FOREIGN PATENT DOCUMENTS 3-136496  10/1989  Japan.

*Primary Examiner*—Brian Zimmerman
*Attorney, Agent, or Firm*—Foley & Lardner

[57] ABSTRACT

An automobile multiplex data communication system includes: a plurality of child stations; a parent station for controlling a multiplex data communication established with the plurality of child stations; and a signal transmission path for mutually connecting the parent station with said plurality of child stations. The parent station is arranged by a storage unit for storing data about a condition-stabilizing time period specific to the operation member, defined by a time duration after the operation member has been manipulated until an operation condition becomes a stable condition; a first operation-condition detecting unit for detecting at least two successive operation conditions of the operation member connected to the communication unit of each child station to produce first and second operation-condition detection data; a condition-change detecting unit for detecting a change in at least the two successive operation conditions of the operation member; a second operation-condition detecting unit for detecting another operation conditions of said operation member after the operation condition change has been detected by the operation-change detecting unit and when the operation-stabilizing time period specific to the operation member has elapsed, thereby producing third operation-condition detection data free from an adverse influence caused by a chattering phenomenon of the operation member; a setting unit for setting a drive instruction of the terminal unit based upon the third operation-condition detection data; and a transmission unit for transmitting the drive instruction to the child station with the operation member whose operation condition has been detected as the third-condition detection data.

22 Claims, 11 Drawing Sheets

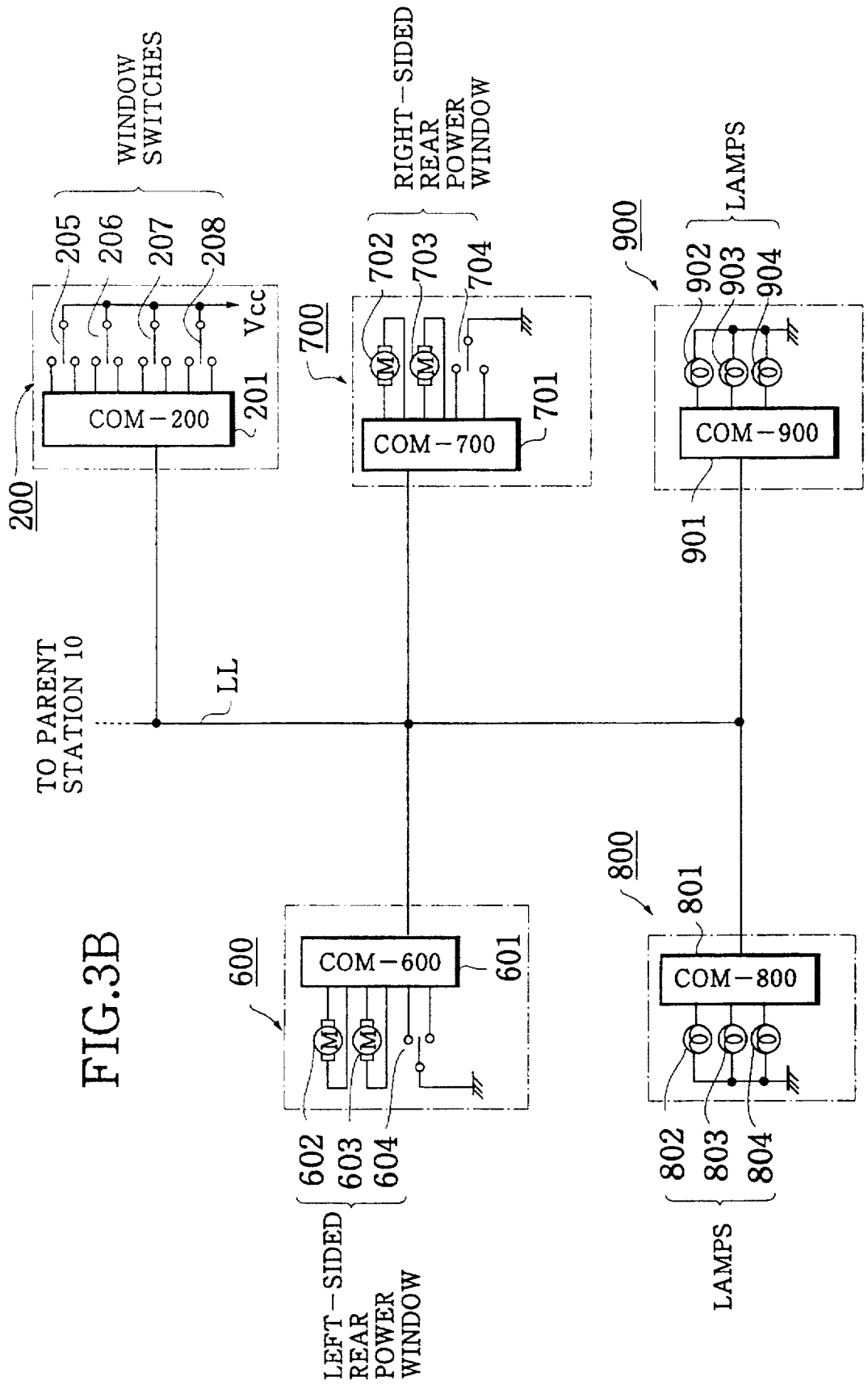

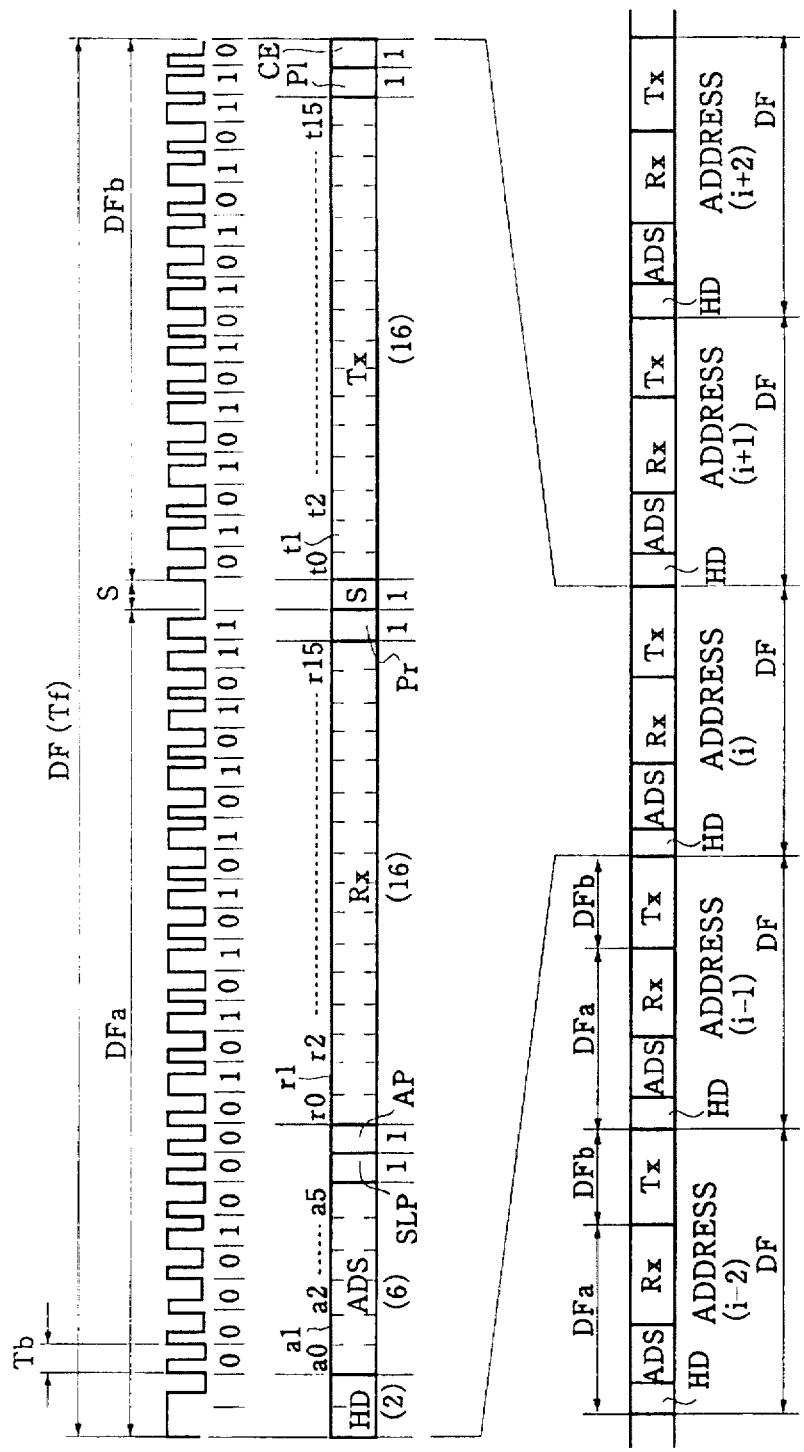

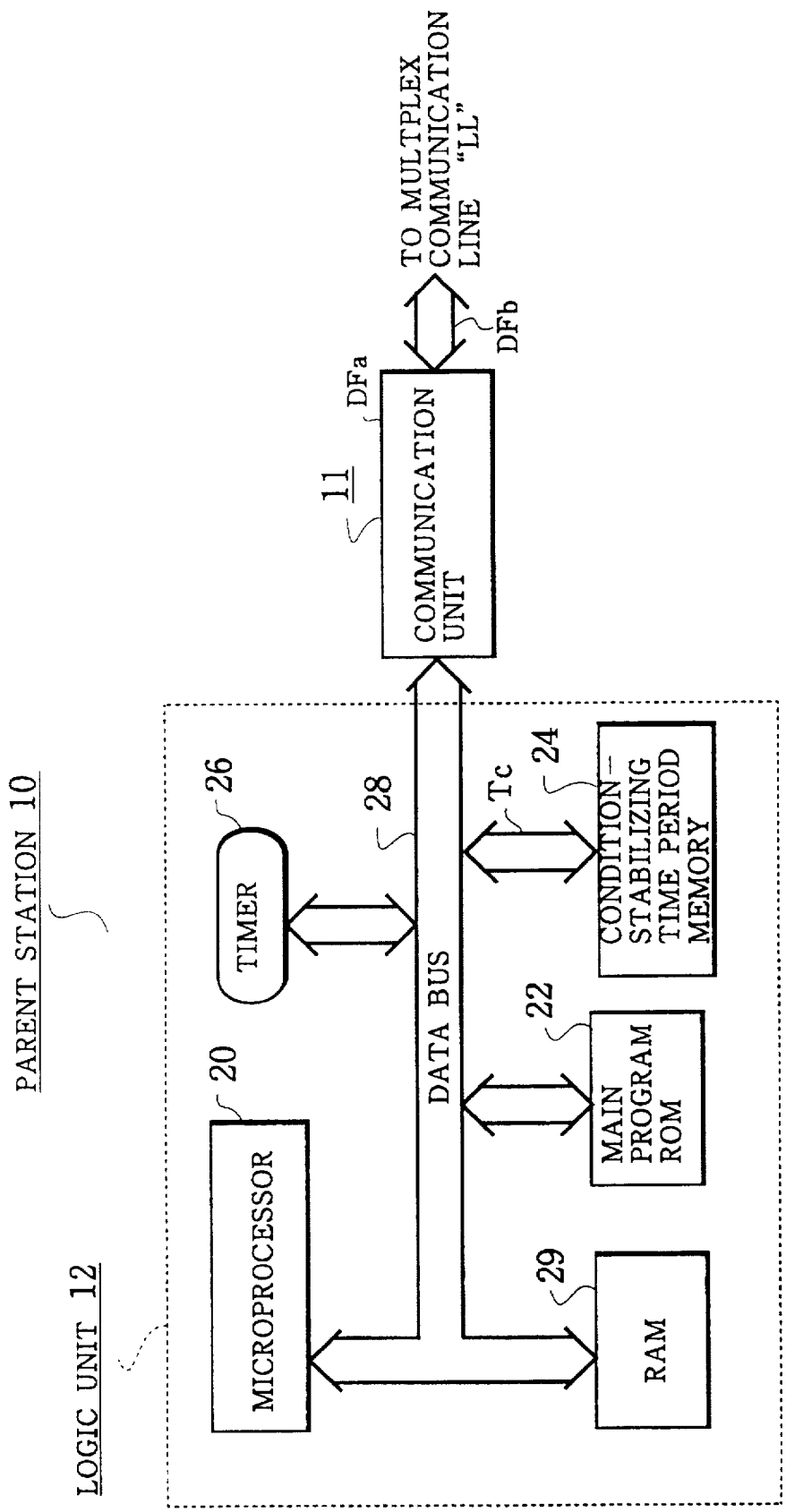

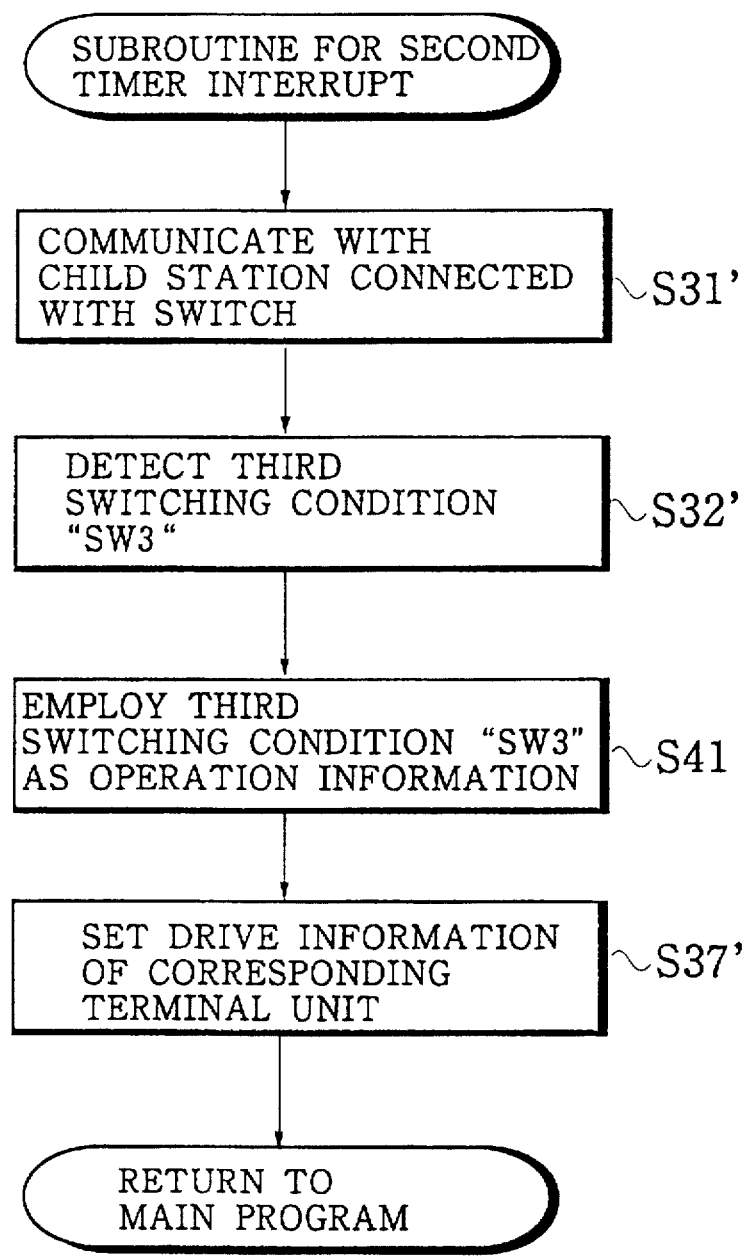

AUTOMOBILE MULTIPLEX DATA COMMUNICATION METHOD AND SYSTEM CAPABLE OF PREVENTING CHATTERING PHENOMENON OF SWITCHING COMPONENT

This application is a continuation of application Ser. No. 08/508,084, filed Jul. 27, 1995, now abandoned, which is a continuation of application Ser. No. 08/024,169, filed Feb. 22, 1993, now abandoned.

BACKGROUND OF THE INVENTION

1. Field of the Invention

The present invention generally relates to an automobile multiplex data communication method and an automatic multiplex data communication system for transmitting operation data about a large quantity of operation members such as head lamps via a small number of transmission lines to a main control unit. More specifically, the present invention is directed to such automobile multiplex data communication method and system capable of preventing an adverse influence caused by a chattering phenomenon of a switching member, which is given to the transmission data.

2. Description of the Prior Art

Very recently, a so-called "multiplex data communication system" has been gradually utilized in an automobile, in which various operation data about a large number of operation members such as brake lamps and power-window switches are transmitted via a small number of multiplex transmission line between a main (parent) station and child stations with such operation members. In the multiplex data communication system, generally speaking, the operation information or data of the operation members, e.g., switches connected to these child stations, is transmitted between the child stations and the parent station. Accordingly, the parent station can detect the operation conditions of these respective operation members based upon the operation information. Then, upon detection of changes in the operation conditions, the parent station sends drive information or data via the multiplex transmission line to the relevant child station to which the terminal unit is connected, so that this terminal unit can be driven under control of the parent station. Such a conventional multiplex data communication system is described from, e.g., Japanese Laid-open (KOKAI DISCLOSURE) Patent Application No. 3-136496 opened on Jun. 1 in 1991.

On the other hand, generally speaking, when an operation member such as a switch is turned ON/OFF, a so-called "chattering phenomenon" happens to occur just after the turning ON/OFF operations, and will disappear after a predetermined time period has elapsed. There are differences in such time durations that the operation conditions of the operation member after the ON/OFF switching operations can become stable, depending upon sorts of the operation members. The operation condition information acquired during such a chattering phenomenon, cannot contain correction data. In other words, the correct operation condition data about the operation member cannot be acquired at a satisfactory level during such a condition-stabilizing time period.

However, the above-described conventional automobile multiplex data communication system has no measure for compensating for the adverse influences caused by the chattering phenomenon of the operation member, so that the correct operation data of this operation member cannot be acquired during the condition-stabilizing time period.

That is, during such a condition-stabilizing time period, qualities of the operation-condition data of the switching members are deteriorated.

SUMMARY OF THE INVENTION

The present invention has been made in an attempt to solve the above-described problems, and therefore, has an object to provide an automatic multiplex data communication method and an automatic multiplex data communication system capable of correctly acquiring operation data about an operation member even during a condition-stabilizing time period required to compensate for adverse influences caused by a chattering phenomenon of this operation member.

To achieve the above-described object, according to one aspect of the present invention, a method for an automatic multiplex data communication system wherein there are provided a plurality of child stations (100:900) each having a child communication unit (1004:1005) to which at least one of an operation member (102:205:504:704:1000) and a terminal unit (302:402:552:702:902:1002) are connected, and a parent station (10) connected via a signal transmission path (1006) to the plural child stations (100:900), and multiplex data communications are sequentially established between the parent station (10) and the respective child stations (100:900), comprises the steps of:

storing data about a condition-stabilizing time period (Tc) specific to said operation member (102:205:504:704:1000), defined by a time duration after said operation member has been manipulated until an operation condition thereof becomes a stable condition;

firstly detecting at least two successive operation condition (SW1:SW2) of said operation member connected to said child communication unit of each child station to produce first and second operation-condition detection data;

secondly detecting a change in at least said two successive operation conditions (SW1:SW2) of the operation member;

thirdly detecting another operation condition (SW3) of the operation member after said operation-condition change 35 has been detected and also when said operation-stabilizing time period (Tc) specific to said operation member has elapsed, thereby producing third operation-condition detection data free from an adverse influence caused by a chattering phenomenon of said operation member;

setting a drive instruction of said terminal unit (302:402:552:702:903:1002) based upon said third operation-condition detection data; and transmitting said drive instruction from said parent station (60) via said signal transmission path to said child station with said operation member whose operation condition(SW3) has been detected as said third operation-condition detection data.

According to another aspect of the present invention, a method for an automatic multiplex data communication system wherein there are provided a plurality of child stations (100:900) each having a child communication unit (1004:1005) to which at least one of an operation member (102:205:504:704:1000) and a terminal unit (302:402:552:702:902:1002) are connected, and a parent station (10) connected via a signal transmission path (1006) to the plural child stations (100:900), and multiplex data communications are sequentially established between the parent station (10) and the respective child stations (100:900), comprises the steps of:

storing data about a condition-stabilizing time period (Tc) specific to said operation member (102:205:504:704:1000), defined by a time duration-after said operation member has been manipulated until an operation condition thereof becomes a stable condition;

firstly detecting at least two successive operation conditions(SW1:SW2) of said operation member connected to said child communication unit of each child station to produce first and second operation-condition detection data;

secondly detecting a change in at least said two successive operation-conditions (SW1:SW2) of the operation member;

thirdly detecting another operation condition (SW3) of the operation member after said operation-condition change has been detected and also when said operation-stabilizing time period (Tc) specific to said operation member has elapsed, thereby producing third operation-condition detection data;

judging whether or not said second operation condition (SW2) of the operation member is coincident with said third operation condition (SW3) thereof;

setting a drive instruction of said terminal unit based upon said third operation-condition (SW2) detection data when said second operation condition (SW2) is coincident with said third operation condition (SW3), said third operation-condition detection data being free from an adverse influence caused by a chattering phenomenon of said operation member; and transmitting said drive instruction from said parent station (10) via said signal transmission path to said child station with said operation member whose operation condition (SW3) has been detected as said third operation-condition detection data.

Further, according to another aspect of the present invention, an automobile multiplex data communication system comprises:

a plurality of child stations (100:900) each having a child communication unit (1004:1005) to which at least one of an operation member (102:205:504:704:1000) and a terminal unit (302:402:552:702:1002) are connected;

a parent station (10) for controlling multiplex data communications established with said plurality of child stations (100:900); and a signal transmission path (1006:LL) for mutually connecting said parent station (10) with said plurality of child stations (100:900), said parent station (10) including:

storage means (1007:24) for storing data about a condition-stabilizing time period (Tc) specific to said operation member (1002:205:504:704:1000), defined by a time duration after said operation member has been manipulated until an operation condition becomes a stable condition;

first operation-condition detecting means (1008) for detecting at least two successive operation conditions (SW1:SW2) of said operation member connected to said communication unit of each child station to produce first and second operation-condition detection data;

condition-change detecting means (1009) for detecting a change in at least said two successive operation conditions (SW1:SW2) of the operation member;

second operation-condition detecting means (1010) for detecting another operation conditions (SW3) of said operation member after said operation-condition change has been detected by said operation-change detecting means (1009) and also when said operation-stabilizing time period (Tc) specific to said operation member has elapsed, thereby producing third operation-condition detection data free from an adverse influence caused by a chattering phenomenon of said operation member;

setting means (1011) for setting a drive instruction of said terminal unit (302:402:552:702:903:1002) based upon said third operation-condition detection data; and transmission means (1012) for transmitting said drive instruction from said parent station (10) via said-signal transmission path to said child station with said operation member whose operation condition has been detected as said third-condition detection data.

Yet, according to a further aspect of the present invention, an automobile multiplex data communication system comprises:

a plurality child stations (100:900) each having a child communication unit (1004:1005) to which at least one of an operation member (102:205:540:704:1000) and a terminal unit (302:402:552:702:1002) are connected;

a parent station (10) for controlling multiplex data communications established with said plurality of child stations (100:900); and signal transmission path (1006:LL) for mutually connecting said parent station (10) with said plurality of child stations (100:900), said parent station (10) including:

storage means (1007:24) for storing data about a condition-stabilizing time period (Tc) specific to said operation member (102:205:540:704:1000), defined by a time duration after said operation member has been manipulated until an operation condition becomes a stable condition;

first operation-condition detecting means (1008) for detecting at least two successive operation conditions (SW1:SW2) of said operation member connected to said communication unit of each child station to produce first and second operation-condition detection data;

condition-change detecting means (1009) for detecting a change in at least said two successive operation conditions (SW1:SW2) of the operation member;

second operation-condition detecting means (1010) for detecting another operation conditions (SW3) of said operation member after said operation-condition change has been detected by said operation-change detecting means (1009) and also when said operation-stabilizing time period (Tc) specific to said operation member has elapsed; thereby producing third operation-condition detection data free from an adverse influence caused by a chattering phenomenon of said operation member;

judging means (1020) for judging whether or not said second operation condition (SW2) of the operation member is coincident with said third operation condition (SW3) thereof;

setting means for setting a drive instruction of said terminal unit based upon said third operation-condition (SW2) detection data when said second operation condition (SW2) is coincident with said third operation condition (SW3), said third operation-condition detection data being free from an adverse influence caused by a chattering phenomenon of said operation member; and transmission means for transmitting said drive instruction from said parent station (10) via said signal transmission path to said child station with said operation member whose operation condition (SW3) has been detected as said third operation-condition detection data.

BRIEF DESCRIPTION OF THE DRAWINGS

FIGS. 3A and 3B schematically represent an overall arrangement of an automobile multiplex data communication system according to a first preferred embodiment of the present invention;

FIG. 4A to 4C schematically indicate a data format employed in the first automobile multiplex data communication system of FIGS. 3A and 3B;

FIG. 5A is a schematic block diagram for showing an internal circuit arrangement of the parent station 10 employed in the data communication system of FIGS. 3A and 3B;

FIG. 9 is a flow chart for explaining a further subroutine of another timer interrupt operation executed based on the first basic idea.

DETAILED DESCRIPTION OF THE PREFERRED EMBODIMENTS

Before proceeding with various preferred embodiments, basic ideas of the present invention will now be described.

Figure 1:
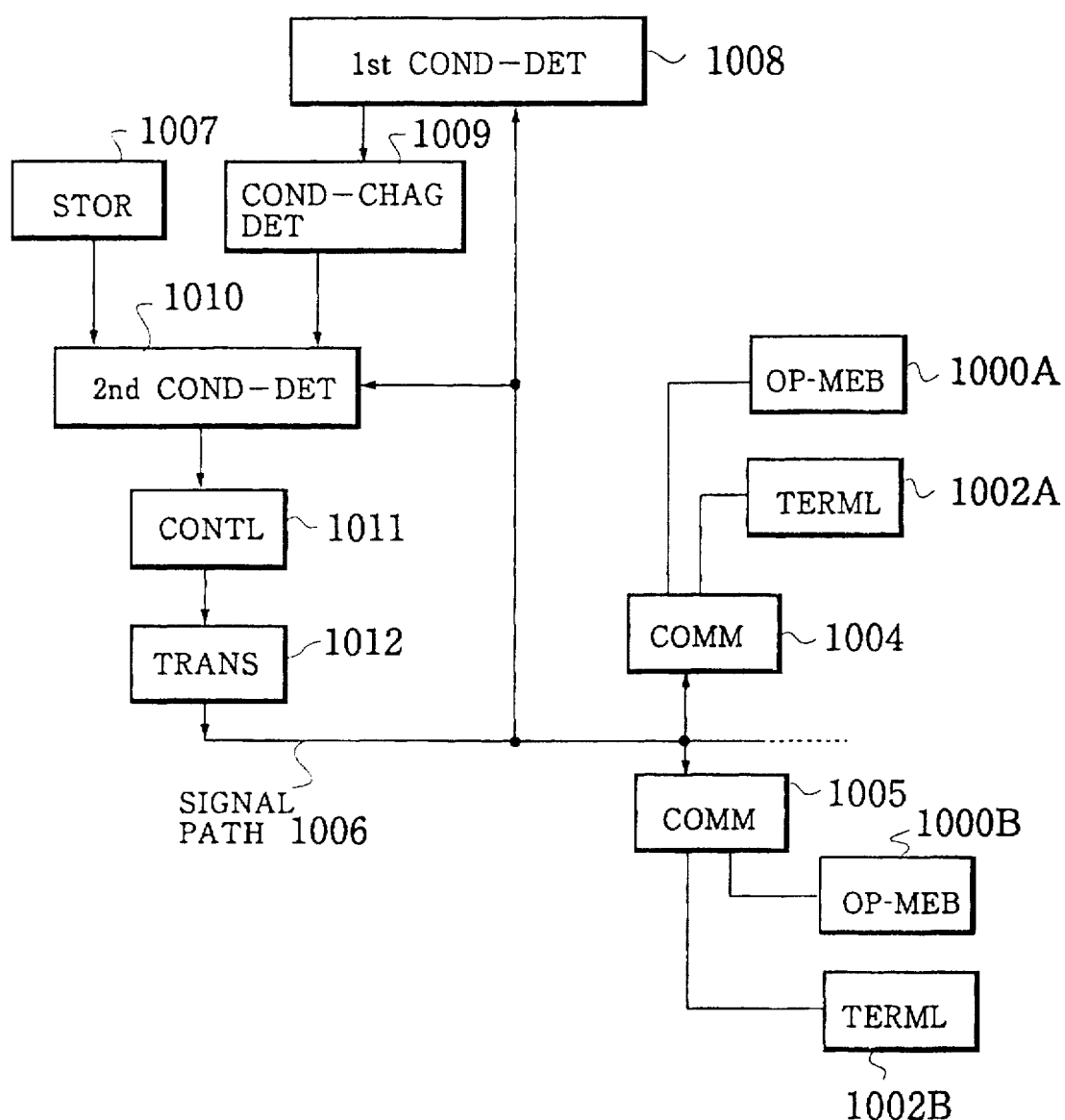
FIG. 1 is an explanatory diagram for showing a first basic idea of the present invention.

FIG. 1 schematically explains a first basic idea concerning an automobile multiplex data communication system according to the present invention.

The automobile multiplex data communication system accomplished based on the first basic idea, is mainly constructed of a plurality of communication means 1004, 1005; a first condition detecting means 1008; a condition-change detecting means 1009; a second condition detecting means 1010; a control means 1011; a transmission means 1012; and a storage means 1007. These means are mutually connected with each other via a signal transmission path 1006.

To each of the communication means 1004 and 1005, an operation member 1000A, 1000B and a terminal unit 1002A, 1002B are connected. The storage means 1007 stores data about condition-stabilizing time periods with respect to the operation members 1000A, 1000B, which are defined by a time duration after the respective operation members 1000A, 1000B have been operated, until the operation conditions thereof become stable. The first condition detecting means 1008 repeatedly detects the conditions of the respective operation members 1000A, 1000B based on the operation information. The condition-change detecting means 1009 detects changes or variations in the operation conditions of the respective operation members 1000A, 1000B based on two successive operation-detecting results obtained by the first condition detecting means 1008. The second condition detecting means 1010 detects the operation condition of the relevant operation member 1000A or 1000B based on the operation information after the condition-change of this operation member had been detected by the condition-change detecting means 1009, and thereafter the condition-stabilizing time period specific to this operation member stored in the storage means 1007 has passed. The control means 1011 sets drive information about the corresponding terminal units 1002A, 1002B based upon the condition of the relevant operation members 1000A, 1000B detected by the second condition detecting means 1010. The transmission means 1012 transmits the drive information set by the control means 1011 to the corresponding communication means 1004, or 1005 via the signal path 1006.

A featured operation of the first basic idea is as follows: The operation-condition change for any one of these operation means 1000A and 1000B is detected by the condition-change detecting means 1009. Namely, a detection is made of the change occurred between the first operation condition of the relevant operation means and the second operation condition thereof. Thereafter, when the condition-stabilizing time period specific to this operation means has elapsed, the third operation condition of this operation means 1000A, or 1000B is detected by the second condition detecting means 1010. Then, the drive information about the corresponding terminal unit 1002A, or 1002B is set by the control means 1011 based on the third condition detection result, and is transmitted to the relevant communication means 1004, or 1005 by the transmission means 1012. As a consequence, the operation conditions of these operation means 1000A, 1000B can be correctly detected, because after the condition-stabilizing time periods specific to the operation members have elapsed, the operation-condition detections are carried out.

Figure 2:
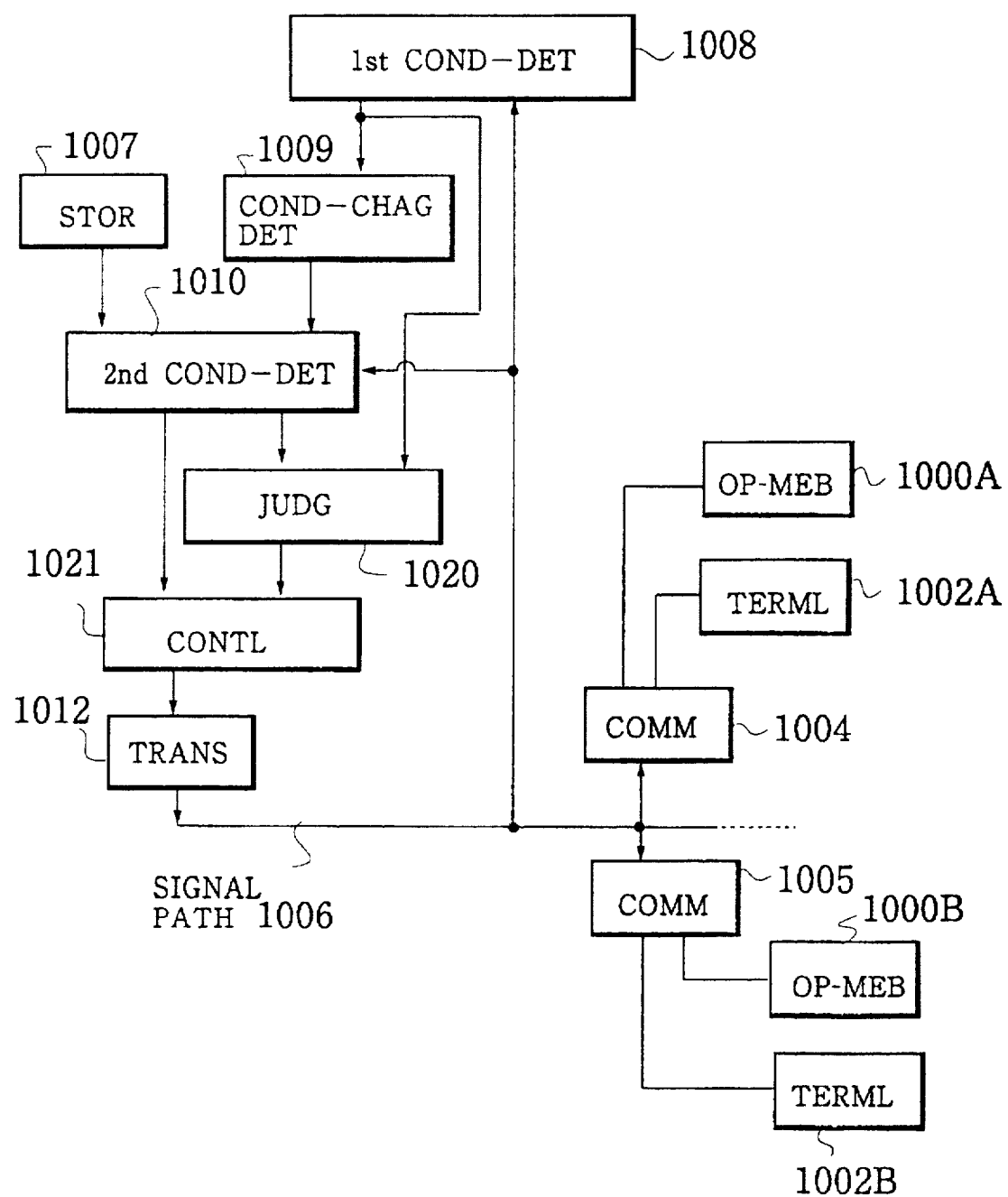
FIG. 2 is an explanatory diagram for representing a second basic idea of the present invention.

FIG. 2 schematically explains a second basic idea of the present invention. As apparent from a block diagram of FIG. 2, most circuit arrangement of the second basic idea is similar to that of the first basic idea shown in FIG. 1. Accordingly, only a different circuit arrangement of the second basic idea will be described. In FIG. 2, a judging means 1020 and a control means 1021 are newly employed. The judging means 1020 receives two condition-detection results from the first condition detecting means 1008 and the second condition detecting means 1010, respectively. Then, the judging means 1020 judges whether or not the operation condition of the operation means 1000A, or 1000B detected by the first condition detecting means 1008 after the condition change of the relevant operation means 1000A, or 1000B, is coincident with the operation condition thereof detected by the second condition detecting means 1010. When a coincident result is issued from the judging means 1020, the control means 1021 sets the drive information of the corresponding terminal unit 1002A, 1002B based upon the operation condition of this operation means 1000A, or 1000B detected by the second condition detecting means 1010.

A featured operation of the second basic idea is as follows: The operation-condition change for any one-of these operation means 1000A and 1000B is detected by the condition-change detecting means 1009. In other words, a detection is made of the change occurred between the first operation condition of the relevant operation means and the second operation condition thereof. Subsequently, when the condition-stabilizing time period specific to this operation means has passed, the third operation condition of this operation means is detected. If the operation condition of the relevant operation means 1000A or 1000B detected by the first condition detecting means 1008 after the condition change thereof is coincident with the third operation condition detected by the second operation condition detecting means 1010, then the drive information about the corresponding terminal unit 1002A, or 1002B is set by the control means 1021 and will be set via the signal path 1006 to the corresponding communication means 1004, or 1005.

Consequently, the operation condition of the operation means 1000A and 1000B can be correctly detected in a similar manner to that of the first basic idea, since the operation conditions of the operation means are detected after these operation conditions can become stable.

Overall Arrangement of First Automobile Multiplex Data Communication System

Figure 3A:
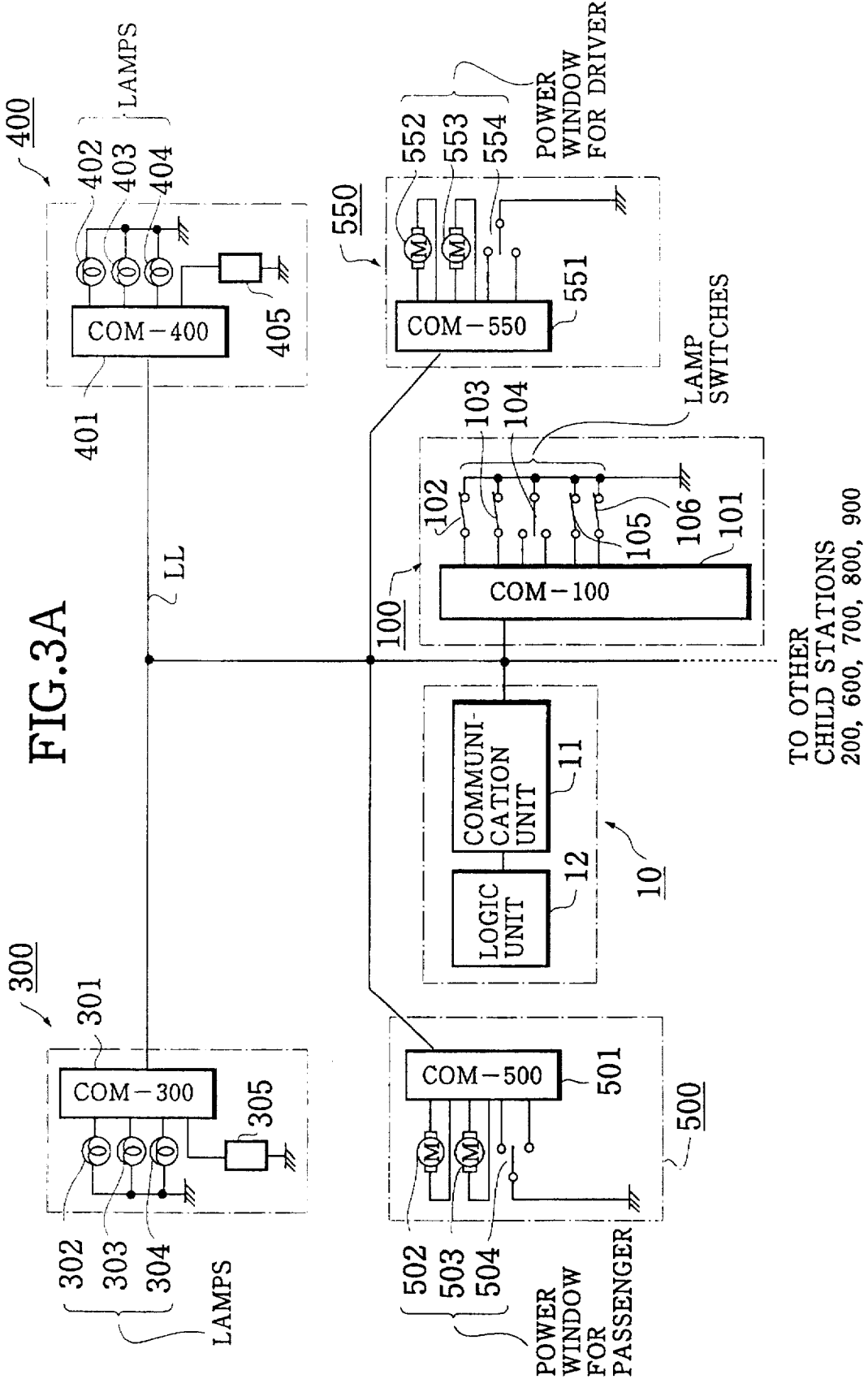

FIGS. 3A and 3B schematically represent an overall circuit arrangement of an automobile multiplex data communication system according to a first preferred embodiment of the present invention.

In the first automobile multiplex data communication system shown in FIGS. 3A and 3B, a plurality of child stations 100, 200, 300, 400, 500, 550, 600, 700, 800, and 900 positioned at various places within an automobile (not shown in detail) are connected via a multiplex data transmission line "LL" to a parent station 10 positioned near a car-driver's seat.

The parent station 10 is mainly constructed of a communication unit 11 and a logic unit 12. As will be described more in detail, the logic unit 12 is arranged by a microprocessor and a peripheral circuit thereof, and mainly controls the relevant terminal units based upon information about operations of the operation means such as switches, which has been acquired via the communication unit 11 from the corresponding child stations 100, - - -, 900.

The first child station 100 is installed adjacent to the car-driver's seat. The first child station 100 includes a child communication unit 101 for establishing a communication between the parent station 10 and this child station 100, and a plurality of operation units (switches) 102 to 106 connected to this child communication unit 101. As these operation units, there are provided a small lamp switch 102 for turning ON/OFF a meter illuminating lamp or the like; a headlamp switch 103 for turning ON/OFF a headlamp; a sidemarker switch 104 for turning ON/OFF a sidemarker lamp; a hazard switch 105 for turning ON/OFF a hazard lamp; and a horn switch 106.

Similarly, a second child station 200 is provided near the car-driver's seat. The second child station 200 is arranged by a communication unit 201 for establishing a communication between the parent station 10 and this child station 200, and also a plurality of operation units connected to this communication unit 201. As these operation units, there are employed a switch 205 for opening/closing a passenger side window; a switch 206 for opening/closing a right-sided rear window; a switch 207 for opening/closing a left-sided rear window; and a door locking switch 208.

A third child station 300 is provided at a front left side of the automobile. The third child station 300 is comprised of a communication unit 301 for establishing a communication with the parent station 10, and a plurality of terminal units connected to this communication unit 301. These terminal units are a small lamp 302, a headlamp 303, a sidemarker lamp 304, and a horn 305. These terminal units are positioned at the front left side of the automobile.

A fourth child station 400 is installed at a front right side of the automobile. The fourth child station 400 is arranged by a communication unit 401 for performing a communication operation with the parent station 10, and also a plurality of terminal units connected to the communication unit 401. These terminal units are a small lamp 402, a headlamp 403, a sidemarker lamp 404, and a horn 405. The terminal units are positioned at the front right side of the automobile.

A fifth child station 500 is provided at a passenger's door of the automobile. This fifth child station 500 is constructed of a communication unit 501 for establishing a communication with the parent station 10, and a plurality of terminal units similarly provided at the passenger's door and connected to the communication unit 501, and also the corresponding operation units. As these terminal units and operation units, there are provided a power window motor 502, a door locking motor 503 and a switch 504 for opening/closing a power window.

A sixth child station 550 is provided at a driver's door. The sixth child station 550 includes a communication unit 551 for performing a communication operation between the parent station 10 and this sixth child station 550, a plurality of terminal units, and corresponding operation units, which are positioned at the driver's door and are connected to the communication unit 551. These terminal units and operation units are a power window motor 552, a door locking motor 553, and a power window opening/closing switch 554.

A seventh child station 600 is installed at a-rear left-sided door of the automobile. This seventh child station 600 is arranged by a communication unit 601 for establishing a communication between the parent station 10 and this child station 600, a plurality of terminal units and corresponding operation units, which are provided at the rear left-sided door and also connected to the communication unit 601. As these terminal units and operation units, there are employed a power window motor 602, a door locking motor 603 and a power window opening/closing switch 604.

An eighth child station 700 is provided at a rear right-sided door of the automobile. The eighth child station 700 includes a communication unit 701 for establishing a communication with the parent station 10, and a plurality of terminal units and also operation units, which are similarly provided at the rear right-sided door and are connected to the communication unit 701. These terminal units and operation units are a power window motor 702, a door locking motor 703, and a power window opening/closing switch 704.

A ninth child station 800 is installed at a rear left side of the automobile. This ninth child station 800 is constructed of a communication unit 801 for establishing a communication with the parent station 10, and also a plurality of terminal units provided at the rear left side of this automobile and connected with the communication unit 801. As these terminal units, there are provided a tail lamp 802, a sidemarker lamp 803 and a license-plate lamp 804.

Furthermore, a tenth child station 900 is installed at a rear right side of the automobile. The tenth child station 900 is arranged by a communication unit 901 for executing a communication operation with the parent station 10, and a plurality of terminal units similarly provided at the rear right side are connected to the communication unit 901. These terminal units are a tail lamp 902, a sidemarker lamp 903, and a license-plate lamp 904.

Communication Data Format Employed in First Automobile Multiplex Data Communication System Referring now to FIGS. 4A, 4B and 4C a communication data format employed in the first automobile multiplex data communication system represented in FIGS. 3A and 3B.

FIG. 4A indicates an example of communication data, FIG. 4B represents a data format with respect to one child station among the child stations having addresses (i–2), - - -, i, - - -, (i+2), and FIG. 4C shows data formats for the child stations having these addresses ADS (i–2), - - -, i, - - -, (i+2). These addresses specify the above-described child stations 100, 200, - - -, 900.

The parent station 10 shown in FIG. 3A designates an address of a child station for a communication purpose to produce communication data "DFa", and transmits this address ADS via the multiplex transmission line LL to all of the child stations 100, - - - , 900. The respective child stations 100, - - - . 900 receive the communication data DFa sent from the parent station 10, and judges whether or not the address "ADS" contained in the communication data "DFa" is coincident with the address preset to the own child station 100, - - - , 900. If these is a coincidence, then another communication data "DFb" is transmitted from the relevant child station via the multiplex transmission line LL to the parent station 10.

As shown in FIG. 4B, the first-mentioned communication data "DFa" sent from the parent station 10 to the child station, is constructed of a 2-bit header signal HD indicative of a start of data; 6-bit address information "ADS"(a0 to a5); a 1-bit sleep bit "SLP" used to stop an operation of a child station; a 1-bit parity bit "AP"; 16-bit drive information "Rx" (r0 to r15); and also 1-bit parity bit "Pr". Namely, this communication data corresponds to 27-bit data.

On the other hand, the second-mentioned communication data "DFb" sent from the child station to the parent station 10 is arranged by 16-bit operation information "Tx" (t0 to t15); a 1-bit parity bit "Pt", and a 1-bit error bit "CE".

It should be noted that communication switching time "S" for switching the communication lines set between the communication data DFa (sent form the parent station 10 to the child station 100, - - - , 900) and the communication data DFb (sent from the child station to the parent station), and no communication is available during this switching time "S".

As shown in FIG. 4A, a unit bit for constituting various information is produced by way of the known PWM (pulse-width modulation) method, and bit time "Tb" of the respective unit bit is set to, for instance, 70 μsec. Furthermore, data time "Tf" of the data format "DF" is set to, for example, 3.5 msec.

Basic Data Communication

For a better understanding of the above-described data format communication system, one basic data communication in case that the small lamp switch 102 employed in the first child station 100 is turned ON, will now be described with reference to FIGS. 3A, 3B, 4A, 4B, and FIG. 4C.

First, to acquire information about switch operations, the parent station 10 transmits the communication data "DFa" via the multiplex transmission line LL to the respective child stations 100, - - - , 900. This communication data DFa is constructed of the header signal "HD", the address information "ADS" (namely, 000001) of the first child station 100; the sleep bit "SLP", the parity bit "AP"; the drive information "Rx" and the parity bit "Pr". At this time, the respective bits "r0" to "r15" of the drive information Rx are set to a logic value of "0", respectively, whereas the parity bit "Pr" is set to a logic value of "1".

Next, upon receipt of this communication data "DFa", the first child station 100 compares the above-described address information ADS with the own address information to judges that this communication data DFa sent from the parent station 10 is directed to the own child station 100. After the communication switching time "S" has passed (see FIG. 4A), this first child station 100 transmits the communication data "DFb" via the multiplex transmission line LL to the parent station 10. This communication data "DFb" is constructed of the operation information Tx, the parity bit Pt, and the error bit CE. At this time, in case that the information about the operation of the small lamp switch 102 corresponds to the data bit "t0", this data bit "t0" is set to a logic value of "0" for indicating that the small lamp switch 102 is turned ON, and furthermore other data bits t1 to t15 are set to a logic value "1", respectively. Both of the parity bit "Pt" and the error bit "CE" are set to a logic value of "0", respectively.

Upon receipt of the communication data DFb sent from the first child station 100, the parent station 10 decodes the operation information Tx, and recognizes or judges that the small lamp switch 102 is turned ON, because the logic value of the data bit t0 corresponds to "0". As a consequence, the parent station 10 executes the below mentioned process to turn ON the corresponding terminal units, namely, the small lamp 302 of the third child station 300, the small lamp 402 of the fourth child station 400; the tail lamp 802 and the license-plate lamp 804 employed in the ninth child station 800; and the tail lamp 902 and the license lamp 904 employed in the tenth child station 900. First, the parent station 10 transmits the communication data "DFa" containing the drive information Rx for turning ON the small lamp 302 of the third child station 300. For instance, when the bit "r0" of the drive information Rx has been allocated to the small lamp 302, this bit is set to a logic value of "0", and all of the remaining bits r1 to r15 are set to a logic value "1", respectively.

When the third child station 300 receives the communication data DF1 sent from the parent station 10, this third child station 300 decodes the drive information Rx contained in the communication data DFa. Upon detection of the bit "r0" being the logic value of "0", the third child station 300 judges that this instruction is to turn ON the small lamp 302, thereby turning ON this small lamp 302. Subsequently, after the communication switching time "S" has elapsed, the third child station 300 transmits the communication data "DFb" to the parent station 10. At this time, since this third child station 300 has no operation unit, the data bits t0, t1, t2, - - - , t15 are set to a logic value of "1", respectively.

In accordance with a similar manner to the above operation, since the parent station 10 transmits such a communication data DFa for turning ON the small lamp 402 to the fourth child station 400, so that the small lamp 402 is turned ON. Similarly, the parent station 10 sends such a communication data DFa for turning ON the tail lamp 802 and the license-plate lamp 804 to the ninth child station 800, and also transmits such a communication data DFa for turning ON both of the tail lamp 902 and the license-plate lamp 904 to the tenth child station 900.

Internal Arrangement of Parent Station

FIG. 5A schematically shows an internal arrangement of the above-described parent station 10. This parent station 10 is mainly constructed of a microprocessor 20, a main program ROM (read-only memory) 22, a condition-stabilizing time period memory 24, a timer 26 and a RAM (random access memory) 29. These components are mutually connected to each other via a data bus 28. This data bus 28 is connected via the communication unit 11 to the multiplex communication line "LL" shown in FIG. 3A and FIG. 3B. The main program ROM 22 previously stores therein main program data. The condition-stabilizing time period memory 24 stores various condition-stabilizing time periods "Tc" specific to the respective switches. For instance, the condition-stabilizing time period "Tc" of the small lamp switch 102 employed in the first child station is selected to be 20 msec which is stored in this condition-stabilizing time period memory. Also, the condition-stabilizing time period "Tc" of the hazard switch 105 is selected to be 100 msec which is similarly stored in this memory 24. The RAM 29 stores data about operation conditions of operation members, e.g., a switching condition of a switch.

Internal Arrangement of Child Station

Figure 5B:
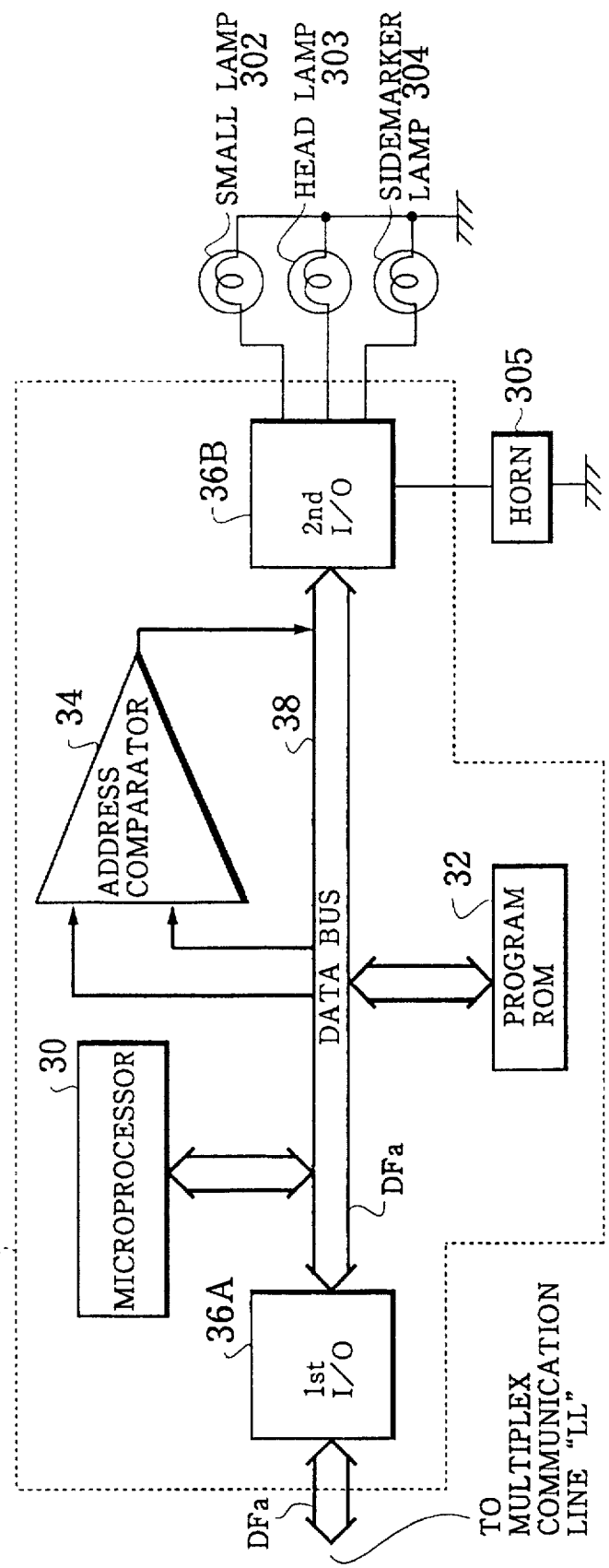
FIG. 5B is a schematic block diagram for indicating an internal circuit arrangement of the child station 300 employed in the data communication system of FIGS. 3A and 3B.

FIG. 5B schematically represents an internal arrangement of the above-explained third child station 300. It should be noted that since the internal arrangement of the communication unit 301 employed in the third child station 300 is similar to other communication units 101, - - - , 901 employed in the remaining child stations 100, - - - , 900, only this internal arrangement of the communication unit 301 will be explained.

In FIG. 5B, the communication unit 301 of the third child station 300 includes a microprocessor 30, a program ROM (read-only memory) 32, an address comparator 34, a first I/O (input/output) unit 36A and a second I/O unit 36B. These circuit components are mutually connected with each other via a data bus 38. The first I/O unit 36A is connected via the multiplex communication line "LL" to the parent station 10 shown in FIG. 5A. The second I/O unit 36B is connected to the various terminal units, namely, the small lamp 302, the head lamp 303, the sidemarker lamp 304 and the horn 305.

In the address comparator 34, one address ADS designated by the parent station 10 is compared with a specific address preset to each of the child stations 100, - - - , 900 under control of the microprocessor 30. If the designated address ADS is coincident with the specific address preset to the relevant child station, then the communication data "DFb" is produced and sent out via the first I/O unit 36A and the multiplex communication line "LL" to the parent station 10.

As previously described, the communication data DFa transmitted from the parent station 10 mainly contains the above-described address ADS designated by the parent station 10 and also the drive information Rx of the terminal units 302 to 305, whereas the communication data DFb transmitted from the child station 300 mainly contains the operation information Tx of the terminal units 302 to 305 acquired via the second I/O unit 36B.

Main Routine for Data Communication

Figure 6:
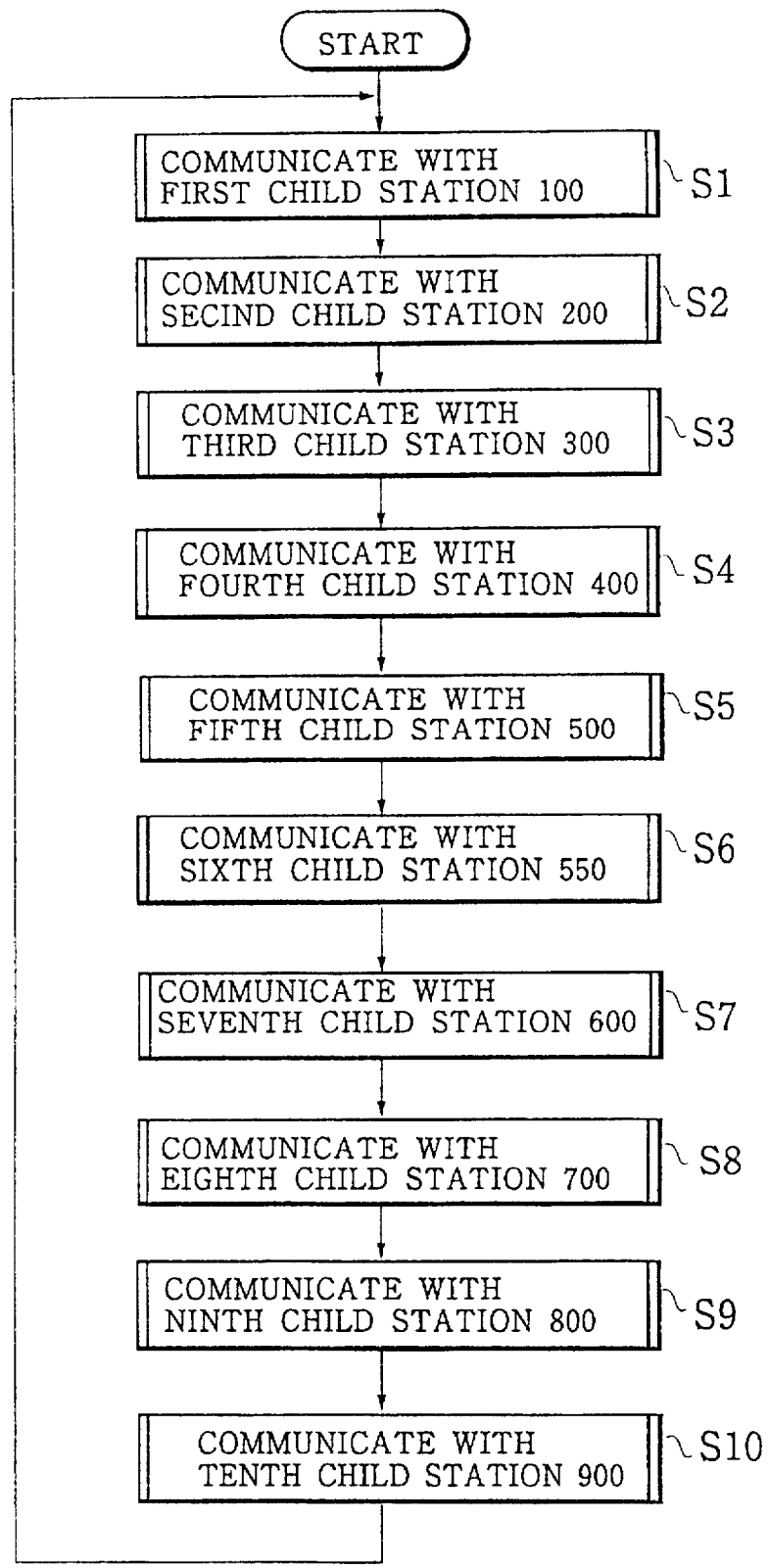
FIG. 6 is a flow chart for explaining a main routine for the entire data communication executed in the first automobile multiplex data communication system.

Referring now to a flow chart of FIG. 6, a main routine for data communication of the first automobile multiplex data communication system shown in FIGS. 3A, 3B, 5A and 5B will be summarized.

When a power supply (not shown in detail) of this first automobile multiplex data communication system is turned ON, the microprocessor 20 employed in the logic unit 12 of the parent station 10 accesses to the main program ROM 22 to read out the main program stored therein. Then, the microprocessor 20 starts to execute the main program as represented in the main routine of FIG. 6. That is, the parent station 10 sequentially establishes data communications with the child stations 100, - - - , 900 from the first step S1 to the last step S10. For instance, at the second step S2, the parent station 10 transmits the communication data "DFa" to the second child station 200 and then this second child station 200 sends the communication data "DFb" to the parent station 10 (see FIG. 4A).

Subroutine for Data Communication

Figure 7:
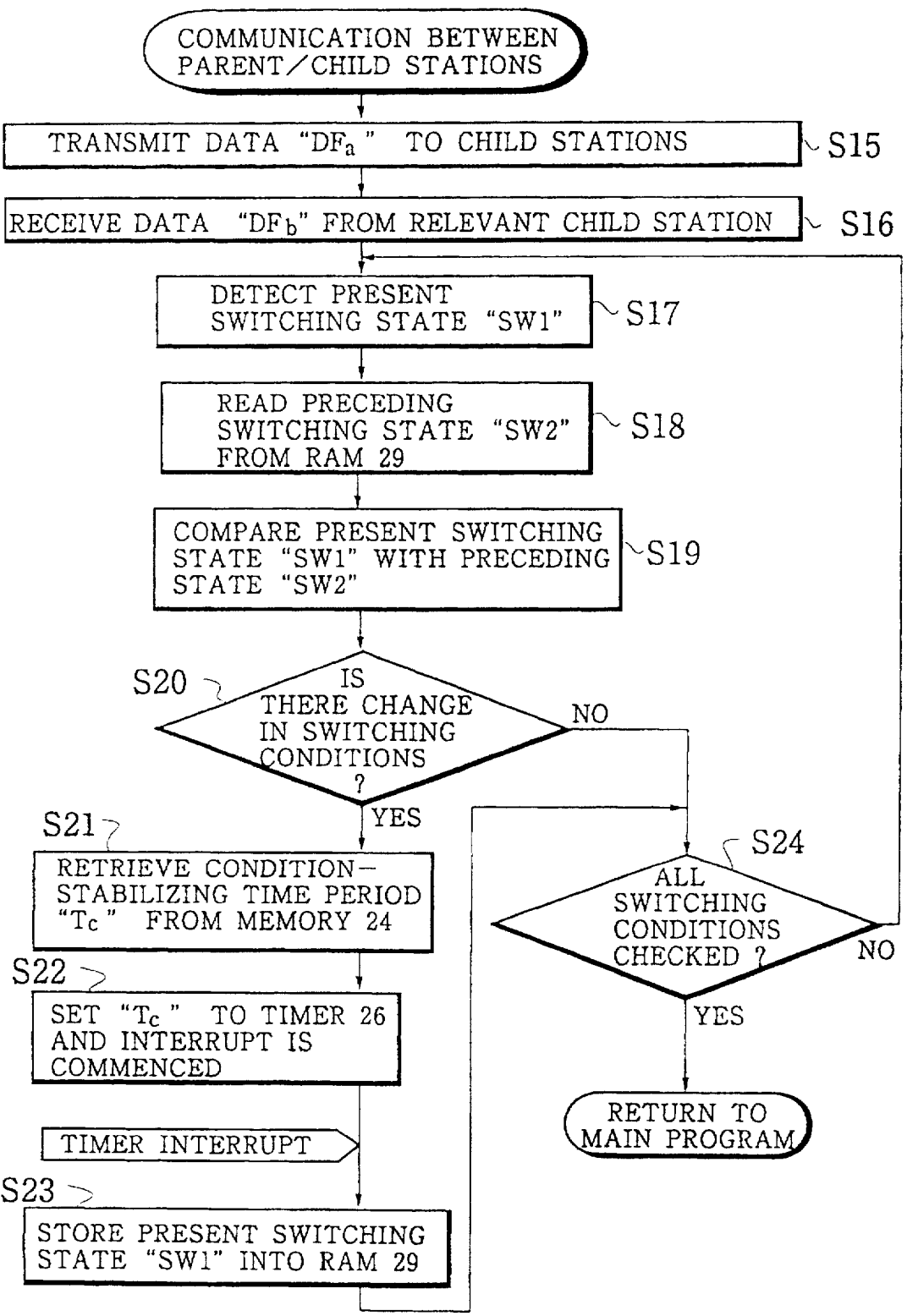
FIG. 7 is a flow chart for explaining a subroutine for one data communication executed in connection with the main routine of FIG. 6.

FIG. 7 represents a data-communication subroutine executed in each of the above-explained steps S1 to S10 shown in FIG. 6.

Referring now to a flow chart of FIG. 7, the data-communication subroutine executed between the parent station 10 and the relevant child station 100, - - - , 900 will be described with reference to, especially, the internal arrangement of the parent station 10 (see FIG. 5).

In this subroutine of FIG. 7, at a first step S15, the parent station 10 designates the address ADS (e.g., "i-1" of FIG. 4C) specific to the relevant child station 100, - - - , or 900 and produces the desirable communication data "DFa" under control of the microprocessor 20. Then, the parent station 10 transmits this communication data "DFa" via the communication unit 11 and the multiplex transmission line LL to all of the child stations 100 through 900, respectively. As previously explained, the drive information "Rx" (see FIG. 4B) for the terminal units connected to the designated child station is contained in this communication data "DFa". Upon receipt of this communication data "DFa", each of the child stations 100 to 900 judges whether or not this designated address "ADS" is coincident with the own specific address preset to these child stations 100, - - - , 900 by the address comparator 34 under control of the microprocessor 30. If YES (coincident), then the communication data "DFb" is produced and transmitted via the first I/O unit 36A and the multiplex transmission line LL to the parent station, 10 under control of the microprocessor 30. This communication data "DFb" mainly contains the operation information "Tx" of these terminal units such as turning-ON of the head lamp 303. Accordingly, the parent station 10 receives this communication data DFb from the third child station 300 at the next step S16.

At the subsequent step S17, the parent station 10 decodes the communication data "DFb" received from the relevant (designated) child station and sequentially detects the operation conditions of the operation members connected to this child station under control of the microprocessor 20 shown in FIG. 5A. If the communication data is transmitted from the first child station 100 via the multiplex transmission line "LL", then the parent station 10 first checks the switching condition of the small lamp switch 102.

It should be noted that since the switching condition checking operations are carried out three times with respect to each switch 102 to 105 in the parent station 10, for the sake of easy explanation, the first switching condition is denoted as "SW1", the second switching condition is represented as "SW2", and the third switching condition is shown as "SW3". Accordingly, at the previous step S17, the first switching condition "SW1" is checked under control of the microprocessor 20 employed in the logic unit 12 of the parent station 10.

At the next step S18, the preceding switching condition "SW2" of this small lamp switch 102 which has been stored in the REM 29 of the logic unit 12 within the parent station 10, is read out by the microprocessor 20. Thereafter, the present switching condition "SW1" is compared with the preceding switching condition "SW2" under control of the microprocessor 20. Subsequently, a judgement is done as to whether or not the operation condition of the small lamp switch 102 is changed based on the above comparison result at a step S20. If there is no change in the switching conditions (namely "NO"), then the control process of this subroutine is advanced to a step S24. To the contrary, if there is a change in the switching conditions (namely "YES"), then the control process is advanced to a step S21.

At this step S21, the condition-stabilizing time period "Tc" specific to this small lamp switch 102, which has been previously stored in the condition-stabilizing time period memory 24, is retrieved under control of the microprocessor 20. Thus, this condition-stabilizing time period "Tc" is read out from this memory 24.

At a further step S22, the retrieved condition-stabilizing time period "Tc" is set to the timer 26 used for an interrupt operation, and then the interrupt operation is commenced. Furthermore, the control process is advanced to a step S23 at which the present switching state "SW1" of this small lamp switch 102 is stored into the RAM 29, and thereafter is advanced to the step S24.

At this step S24, a check is done as to whether or not the condition-change detections for all of the switches 102 through 105 have been completed. These switches 102 to 105 are connected to the communication unit 101 of the first child stations 100. If all of the condition-change detections have not yet been completed (namely "NO"), then the control process is returned to the previous step S17 at which a series of the above-described process operation is performed with respect to the subsequent switches, e.g., the head lamp switch 103. To the contrary, if all of these condition-change detections have been accomplished (namely "YES"), then the control process is returned to the main program shown in FIG. 6.

First Timer Interrupt Operation

Figure 8:
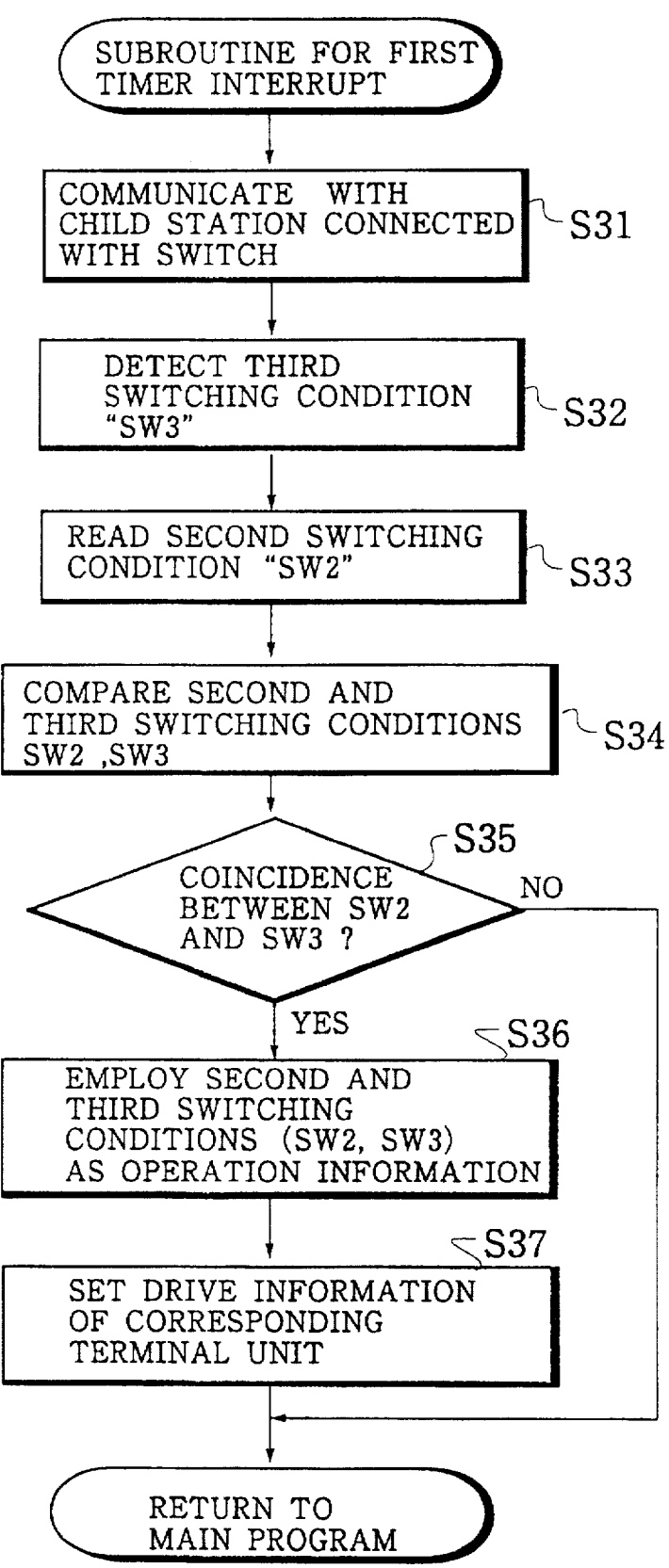
FIG. 8 is a flow chart for explaining another subroutine for one timer interrupt operation performed based on the second basic idea.

When the timer 26 is timed up, into which the condition-stabilizing time period "Tc" has been set at the previous step S22 of the subroutine shown in FIG. 7, a first timer-interrupt operation indicated in FIG. 8 will be executed, so that the microprocessor 20 interrupts other process operation and then executes this first timer interrupt subroutine shown in FIG. 8.

It should be understood that this first timer-interrupt operation correspond to the second basic idea of the present invention.

At a first step S31 of this timer-interrupt subroutine shown in FIG. 8, the parent station 10 again establishes a further communication with another child station 100, - - -, or 900, to which the switch whose condition change has been detected in accordance with the above-described sequential operation (see FIG. 7) is connected, so that this parent station 10 receives the communication data "DFb". At the next step S32, the parent station 10 investigates this communication data "DFb" received from the relevant child station to detect a third switching condition "SW3" of this switch. Subsequently, at a step S33, the second switching condition "SW2" stored in the RAM 29 of the logic unit 12 at the previous step S23 (see FIG. 7), is read out from this RAM 29 under control of the microprocessor 20. Furthermore, the second switching condition "SW2" is compared with the third switching condition "SW3" at a step S34 under control of the microprocessor 20. Then, a judgement is made as to whether or not the second switching condition "SW2" is coincident with the third switching condition "SW3" at a step S35. If YES (coincident), then the control process is advanced to a next step S36. To the contrary, if NO (incoincident), then the control process is returned to the main program shown in FIG. 6. Accordingly, a further data communication will be carried out between the next child station and the parent station 10.

At the step S36, since these two switching conditions SW2 and SW3 are coincident with each other, both of these second and third switching conditions SW2 and SW3 are employed as reliable operation information. At the next step S37, the drive information Rx for the corresponding terminal unit is set based upon this reliable operation information for the switch.

For instance, as shown in FIG. 3A, the motor 502 of the passenger power window is connected to the fifth child station 500. Therefore, when the switch 504 for the passenger power window is turned ON (namely, the passenger power window is opened), assuming now that the bit of the drive information Rx corresponding to the motor 502 for the passenger power window is selected to be "r0", the bit "r0" of the drive information to the child station 500 is set to the logic value "0". This drive information Rx is transmitted from the parent station 10 as the communication data "DFa" during the subsequent communication with the child station 500. Upon receipt of this communication data "DFa" from the parent station 10, the fifth child station 500 detects that this bit "r0" corresponds to a logic level of "0". Then, this fifth child station 500 judges that this drive information implies an instruction to open the passenger power window by energizing the motor 502 along the door-opening direction.

After the above-described drive information Rx has been set, the control process is returned to the main program of FIG. 6, similar to the case of the in coincident switching condition at the step S35.

It should be understood that since the above-explained first timer-interrupt operation has been set to all of the switches whose switching-operation changes had been detected by the parent station 10, there are some possibilities that a plurality of timer interrupt demands are issued at the same time. In such a simultaneous interrupt demand, the first interrupt process operations are successively carried out in accordance with a predetermined priority order in this preferred embodiment. For instance, since the head lamp switch 103 of the first child station 100 has a higher response characteristic than that of the passenger's power window switch 504 of the fifth child station 500, when both of the timer interrupt demands for the head lamp switch 103 and the passenger's power window switch 504 happen to occur at the same time, the first timer-interrupt operation for the head lamp switch 103 is firstly performed.

As previously explained, according to the first preferred embodiment, the operation conditions of the respective switches are repeatedly detected by the parent station 10 based on the operation information sent from the child stations. When the change in the switching conditions of any one of these switches is detected, the operation condition "SW3" of this relevant switch is again detected after the condition-stabilizing time period "Tc" specific to this switch has elapsed. Then, if the second switching condition "SW2" detected after the previous condition change is coincident with the third switching condition "SW3", then these switching conditions SW2 and SW3 are employed as the reliable operation information. Since the drive information for the corresponding terminal unit is set based upon these switching conditions SW2 and SW3, which will then be sent to the relevant child station, the operation (switching) conditions of the switches can be correctly detected, and also the corresponding terminal unit (e.g., head lamp) can be surely driven.

In other words, according to the first automobile multiplex data communication system, since the operation-condition coincidence check is performed between the second operation condition "SW2" and the third operation condition "SW3" after the operation-condition change has been checked, this first multiplex data communication method corresponds to the second basic idea.

Subroutine Second Timer Interrupt

As previously described, in the above-described first preferred embodiment, the switching-condition comparing operation is carried out at the step S34 of FIG. 8 after the condition-stabilizing time period "Tc" has elapsed in response to the detection of the switching-condition change. That is, the second basic idea of the present invention is executed in this first preferred embodiment.

Now, an automobile multiplex data communication system according to a second preferred embodiment of the present invention will be explained in which the fist basic idea is performed. Simply speaking, in the second automobile multiplex data communication system, the third switching condition SW3 is merely detected after the condition-stabilizing time period "Tc" specific to the relevant switch has passed without performing such a switching-condition comparison. Then, this third switching condition SW3 is employed as the reliable (useable) operation information.

A second timer interrupt operation for the second preferred embodiment (namely, first basic idea) will now be explained with reference to a flow chart of FIG. 9.

At a first step S31' of the subroutine for the second timer interrupt operation shown in FIG. 9, the parent station 10 establishes a communication with a child station 100, - - - , or 900 to which a switch is connected. A change in switching conditions of this switch has been detected. Accordingly, the parent station 10 receives the communication data "DFb" from this child station in a similar manner to the step S31 of the above-described first timer-interrupt process (see FIG. 8). At a next step S32', the parent station 10 investigates this communication data "DFb" to detect the third switching state "SW3" of this switch. Thereafter, the third switching state "SW3" is employed as the reliable operation information at a step S41. At a last step S37', the drive information Rx of the relevant terminal unit is set based on this operation information about the relevant switch, which is similar to the setting operation of the step S37 in the first timer interrupt process.

As previously stated, according to the second preferred embodiment, the switching conditions of the respective switches are repeatedly detected by the parent station 10 based on the operation information transmitted from the child stations. The change in the switching conditions of any one of these switches is detected by the parent station. Subsequently, after the condition-stabilizing time period "Tc" specific to this switch has elapsed, the switching condition (namely, third switching state SW3) is again detected. This detected switching condition SW3 is employed as the reliable operation information. Then, since the drive information about the corresponding terminal unit is set by the parent station 10 based upon this third switching state SW3 and is transmitted to the relevant child station, the switching conditions of this switch in the relevant child station can be correctly detected (namely, no chattering phenomenon gives adverse influence to the switching conditions), and furthermore the relevant terminal unit employed in the relevant child station can be surely driven.

As apparent from the foregoing descriptions, the present invention is not limited to the above-described preferred embodiments, but may be modified, changed or substituted without departing from a technical spirit and scope of the present invention.

For instance, top priority for timer interrupt process may be given to the horn switch 106 employed in the first child station 100. As a consequence, even if the timer interrupt process for other switches, e.g., the sidemarker switch 104 is executed, this timer-interrupt process may be temporarily stopped and the timer interrupt process for the horn switch 106 may be performed.

Also, although the data communication is carried out between the parent station 10 and the respective child stations 100, - - - , 900 in the above-described first and second preferred embodiments, such a data communication may be executed among these child stations 100, - - - , 900 in such a manner that a logic unit similar to the above-explained logic unit 12 is employed in the respective child stations.

What is claimed is:

1. A method for an automatic multiplex data communication system wherein there are provided a plurality of child stations each having a child communication unit to which at least one of an operation member and a terminal unit are connected, and a parent station connected via a signal transmission path to the plurality of child stations, and multiplex data communications are sequentially established between the parent station and the respective child stations, comprising the steps of:

storing, in the parent stations, a plurality of condition-stabilizing time periods, each condition-stabilizing time period being specific to a respective operation member and being defined by a time duration after the respective operation member has been manipulated until an operation condition thereof becomes a stable condition;

the parent station firstly detecting at least two successive operation conditions of one operation member of said operation members to produce first and second operation-condition detection data;

the parent station secondly detecting a difference between said two successive operation conditions of the one operation member;

the parent station thirdly allowing a condition stabilizing time period specific to said one operation member to elapse;

the parent station fourthly detecting another operation condition of the one operation member, thereby producing third operation-condition detection data free from an adverse influence caused by a chattering phenomenon of said one operation member;

the parent station setting a drive instruction of a terminal unit based upon said third operation-condition detection data; and transmitting said drive instruction from said parent station via said signal transmission path to a child station corresponding to the terminal unit.

2. A method for an automatic multiplex data communication system as claimed in claim 1, wherein said third operation-condition detecting step, said drive-instruction setting step, and said drive-instruction transmitting step are executed as a timer interrupt operation when said condition-stabilizing time period has elapsed.

3. A method for an automatic multiplex data communication system as claimed in claim 2, further comprising the step of:

determining a priority order with respect to said third operation-condition detecting steps for said operation members of said plural child stations, whereby when a plurality of timer interrupt operations are demanded at a substantially same time instant, said third operation-condition detecting step for the operation member having a top priority is executed first of all.

4. A method for sequentially establishing automatic multiplex data communications between a parent station and first and second child stations connected to the parent station via a signal transmission path, wherein the first child station has a first child communication unit connected to a first operation member and a first terminal unit, and the second child station has a second child communication unit connected to a second operation member and a second terminal unit, the method comprising the steps of:

storing a first condition-stabilizing time period corresponding to the first operation member in the parent station, the first condition-stabilizing time period representing a time after the first operation member is manipulated until the first operation member becomes stable;

storing a second condition-stabilizing time period corresponding to the second operation member in the parent station, the second condition-stabilizing time period being different from the first condition-stabilizing time period and representing a time after the second operation member is manipulated until the second operation member becomes stable;

detecting, at the parent station, a first operation condition of one of the first and second operation members;

detecting, at the parent station, a second operation condition of said one of the first and second operation members;

determining, at the parent station, a difference between the first operation condition and the second operation condition;

detecting, at the parent station, a third operation condition of said one of the first and second operation members after allowing the condition-stabilizing time period specific to said one of the first and second operation members to elapse, the third operation condition thereby being free from an adverse influence caused by a chattering phenomenon of said one of the first and second operation members;

setting, at the parent station, a drive instruction for the terminal unit corresponding to said one of the first and second operation members based, upon the third operation condition; and transmitting the drive instruction from the parent station to the child station corresponding to the terminal corresponding to said one of the first and second operation members via the signal transmission path.

5. An automobile multiplex data communication system comprising:

a first child station having a first child communication unit connected to a first operation member and a first terminal unit;

a second child station having a second child communication unit connected to a second operation member and a second terminal unit;

a parent station for controlling multiplex data communications established with said first and second child stations; and a signal transmission path for mutually connecting said parent station with said first and second child stations, wherein said parent station includes;

storage means for storing a first condition-stabilizing time period specific to the first operation member and defined by a time duration after the first operation member is manipulated until an operation condition of the first operation member becomes stable and a second condition-stabilizing time period specific to the second operation member, different from the first condition-stabilizing time period, and defined by a time duration after the second operation member is manipulated until an operation condition of the second operation member becomes stable;

first operation-condition detecting means for detecting a first operation condition and a second operation condition of one the first and second operation members;

condition-change detecting means for detecting a difference between the first operation condition and the second operation condition;

second operation-condition detecting means for detecting a third operation condition of said one of the first and second operation members after the condition-change detecting means has detected the difference between the first operation condition and the second operation condition and the condition-stabilizing time period corresponding to said one of the first and second operation members has subsequently elapsed, such that the third operation condition is free from an adverse influence caused by a chattering phenomenon of said one of the first and second operation members;

setting means for setting a drive instruction of the terminal unit corresponding to said one of the first and second operation members based on said third operation condition; and transmission means for transmitting the drive instruction from the parent station via the signal transmission path to the child station corresponding to the terminal unit corresponding to said one of the first and second operation members.

6. A method for an automatic multiplex data communication system wherein there are provided a plurality of child stations each having a child communication unit to which at least one of an operation member and a terminal unit are connected, and a parent station connected via a signal transmission path to the plurality of child stations, and multiplex data communications are sequentially established between the parent station and the respective child stations, comprising the steps of:

storing, in the parent station, a plurality of condition-stabilizing time periods, each condition-stabilizing time period being specific to a respective operation member and being defined by a time duration after the respective operation member has been manipulated until an operation condition thereof becomes a stable condition;

the parent station firstly detecting at least two successive operation conditions of one operation member of said operation members to produce first and second operation-condition detection data;

the parent station secondly detecting a difference between said two successive operation-conditions of the one operation member;

the parent station thirdly allowing a condition-stabilizing time period specific to said one operation member to elapse;

the parent station fourthly detecting another operation condition of the one operation member, thereby producing third operation-condition detection data;

the parent station determining whether said second operation condition of the one operation member is coincident with said third operation condition thereof;

the parent station setting a drive instruction of a terminal unit based upon said third operation-condition detection data when said second operation condition is coincident with said third operation condition, said third operation-condition detection data being free from an adverse influence caused by a chattering phenomenon of said one operation member; and transmitting said drive instruction from said parent station via said signal transmission path to a child station corresponding to the terminal unit.

7. A method for an automatic multiplex data communication system as claimed in claim 6, wherein said third operation-condition detecting step, said drive-instruction setting step, and said drive-instruction transmitting step are executed as a timer interrupt operation when said condition-stabilizing time period has elapsed.

8. A method for an automatic multiplex data communication system as claimed in claim 7, further comprising the step of:

determining a priority order with respect to said third operation-condition detecting steps for said operation members of said plural child stations, whereby when a plurality of timer interrupt operations are demanded at a substantially same time instant, said third operation-condition detecting step for the operation member having a top priority is executed first of all.

9. An automobile multiplex data communication system comprising:

a plurality of child stations each having a child communication unit to which at least one of an operation member and a terminal unit are connected;

a parent station for controlling multiplex data communications established with said plurality of child stations; and a signal transmission path for mutually connecting said parent station with said plurality of child stations, wherein said parent station includes;

storage means for storing a plurality of condition-stabilizing time periods, each condition-stabilizing time period being specific to a respective operation member and defined by a time duration after the respective operation member has been manipulated until an operation condition thereof becomes a stable condition;

first operation-condition detecting means for detecting at least two successive operation conditions of one operation member of said operation members to produce first and second operation-condition detection data;

condition-change detecting means for detecting an operation-condition difference between the at least two successive operation conditions of the one operation member;

second operation-condition detecting means for detecting another operation condition of said one operation member after said operation-condition difference has been detected by said condition-change detecting means and a condition-stabilizing time period specific to said one operation member has subsequently elapsed, thereby producing third operation-condition detection data free from an adverse influence caused by a chattering phenomenon of said one operation member;

setting means for setting a drive instruction of a terminal unit based upon said third operation-condition detection data; and transmission means for transmitting said drive instruction from said parent station via said signal transmission path to a child station corresponding to the terminal unit.

10. An automobile multiplex data communication system as claimed in claim 9, wherein each of said child stations includes:

address comparing means for comparing first address data contained in said drive instruction sent from said parent station with second address data preset to own child station to check a coincidence between said first and second address data, thereby judging whether or not said drive instruction is directed to said own child station.

11. An automobile multiplex data communication system as claimed in claim 9, wherein said parent station further includes:

timer means for counting an elapse of time defined by said condition-stabilizing time period specific to said one operation member, and when said condition-stabilizing time period has elapsed, a timer interrupt demand is issued, thereby producing said third operation-condition detection data.

12. An automobile multiplex data communication system as claimed in claim 11, wherein said parent station further includes:

a RAM (random access memory) for temporarily storing at least one of said first and second operation-condition detection data.

13. An automobile multiplex data communication system as claimed in claim 9, wherein said first operation-condition detecting means, said condition-change detecting means, said second operation-condition detecting means, and said setting means are accomplished by a microprocessor.

14. An automobile multiplex data communication system as claimed in claim 9, wherein said one operation member is a switch and said terminal unit is one of automobile lamps, power-window motors, and horns.

15. An automobile multiplex data communication system as claimed in claim 14, wherein when a small lamp switch is employed as said switch, said condition-stabilizing time period is selected to be approximately 20 milliseconds, whereas when a hazard lamp switch is employed as said switch, said condition-stabilizing time period is selected to be approximately 100 milliseconds.

16. An automobile multiplex data communication system comprising:

a plurality of child stations each having a child communication unit to which at least one of an operation member and a terminal unit are connected;

a parent station for controlling multiplex data communications established with said plurality of child stations; and a signal transmission path for mutually connecting said parent station with said plurality of child stations, wherein said parent station includes:

storage means for storing a plurality of condition-stabilizing time periods, each condition-stabilizing time period being specific to a respective operation member and defined by a time duration after the respective operation member has been manipulated until an operation condition thereof becomes a stable condition;

first operation-condition detecting means for detecting at least two successive operation conditions of one operation member of said operation members to produce first and second operation-condition detection data;

condition-change detecting means for detecting an operation-condition difference between the at least two successive operation conditions of the one operation member;

second operation-condition detecting means for detecting another operation condition of said one operation member after said operation-condition difference has been detected by said condition-change detecting means and a condition-stabilizing time period specific to said one operation member has subsequently elapsed, thereby producing third operation-condition detection data free from an adverse influence caused by a chattering phenomenon of said one operation member;

judging means for judging whether or not said second operation condition of the one operation member is coincident with said third operation condition thereof;

setting means for setting a drive instruction of a terminal unit based upon said third operation-condition detection data when said second operation condition is coincident with said third operation condition, said third operation-condition detection data being free from an adverse influence caused by a chattering phenomenon of said one operation member; and transmission means for transmitting said drive instruction from said parent station via said signal transmission path to a child station corresponding to the terminal unit.

17. An automobile multiplex data communication system as claimed in claim 16, wherein said parent station further includes:

timer means for counting an elapse of time defined by said condition-stabilizing time period specific to said operation member, and when said condition-stabilizing time period has elapsed, a timer interrupt demand is issued, thereby producing said third operation-condition detection data.

18. An automobile multiplex data communication system as claimed in claim 17, wherein said parent station further includes:

a RAM (random access memory) for temporarily storing at least one of said first and second operation-condition detection data.

19. An automobile multiplex data communication system as claimed in claim 16, wherein said first and second operation-condition detecting means, said condition-change detecting means, said judging means, and said setting means are accomplished by a microprocessor.

20. An automobile multiplex data communication system as claimed in claim 16, wherein said operation member is a switch and said terminal unit is one of automobile lamps, power-window motors, and horns.

21. An automobile multiplex data communication system as claimed in claim 20, wherein when a small lamp switch is employed as said switch, said condition-stabilizing time period is selected to be approximately 20 milliseconds, whereas when a hazard lamp switch is employed as said switch, said condition-stabilizing time period is selected to be approximately 100 milliseconds.

22. An automobile multiplex data communication system as claimed in claim 16, wherein each of said child stations includes:

address comparing means for comparing first address data contained in said drive instruction sent from said parent station with second address data preset to own child station to check a coincidence between said first and second address data, thereby judging whether or not said drive instruction is directed to said own child station.

* * * * *